(12) United States Patent
Beringer et al.

(10) Patent No.: US 8,195,631 B2
(45) Date of Patent: Jun. 5, 2012

(54) RESOURCE FINDER TOOL

(75) Inventors: Joerg Beringer, Frankfurt (DE);
Annette Haeussler, Heidelberg (DE);
Sandra Nieves, Karlsruhe (DE)

(73) Assignee: SAP AG, Walldorf (DE)

( * ) Notice: Subject to any disclaimer, the term of this patent is extended or adjusted under 35 U.S.C. 154(b) by 974 days.

(21) Appl. No.: 10/658,584

(22) Filed: Sep. 8, 2003

(65) Prior Publication Data

US 2004/0133413 A1 Jul. 8, 2004

Related U.S. Application Data

(60) Provisional application No. 60/436,219, filed on Dec. 23, 2002, provisional application No. 60/471,297, filed on May 16, 2003.

(51) Int. Cl.
*G06F 7/00* (2006.01)
*G06F 17/30* (2006.01)

(52) U.S. Cl. ........ 707/705; 707/722; 707/731; 707/732; 707/736; 707/758

(58) Field of Classification Search ................ 707/1–10, 707/736, 754, 758, 705, 722, 731, 732, 999.1, 707/999.3
See application file for complete search history.

(56) References Cited

U.S. PATENT DOCUMENTS

| | | | |
|---|---|---|---|
| 5,634,127 A | 5/1997 | Cloud et al. | |
| 5,721,906 A * | 2/1998 | Siefert | 707/9 |
| 5,754,939 A | 5/1998 | Herz et al. | |
| 5,802,499 A | 9/1998 | Sampson et al. | |
| 5,826,239 A | 10/1998 | Du et al. | |
| 5,870,545 A | 2/1999 | Davis et al. | |
| 5,893,074 A | 4/1999 | Hughes et al. | |
| 5,899,979 A | 5/1999 | Miller et al. | |
| 6,003,011 A | 12/1999 | Sarin et al. | |
| 6,052,684 A | 4/2000 | Du | |
| 6,078,982 A | 6/2000 | Du et al. | |
| 6,167,564 A | 12/2000 | Fontana et al. | |
| 6,185,587 B1 | 2/2001 | Bernardo et al. | |
| 6,189,003 B1 | 2/2001 | Leal | |
| 6,233,600 B1 | 5/2001 | Salas et al. | |
| 6,278,977 B1 | 8/2001 | Agrawal et al. | |
| 6,297,819 B1 | 10/2001 | Furst | |
| 6,327,628 B1 | 12/2001 | Anuff et al. | |
| 6,473,751 B1 | 10/2002 | Nikolovska et al. | |
| 6,484,149 B1 | 11/2002 | Jammes et al. | |

(Continued)

OTHER PUBLICATIONS

3Com Palm VII Wireless Access Now Available for the project Gateway Enterprise Project Management System, Business Editors/High-Tech Writers, Business Wire, New York, Oct. 26, 1999 (proquest).

(Continued)

*Primary Examiner* — Hares Jami
(74) *Attorney, Agent, or Firm* — Finnegan, Henderson, Farabow, Garrett & Dunner, L.L.P.

(57) ABSTRACT

Systems and techniques to develop an enterprise management consolidation system are described including a cross-functional application to provide communication between at least one of an object modeling tool, a process modeling tool and a user interface tool. The user interface tool is configured to find resources having desired characteristics. In general, in one implementation, the technique includes receiving characteristics of a resource desired by a user and searching a data source of resource profiles to locate profiles having one or more of the characteristics. The located profiles are provided to the user in a hit-list, which may then be narrowed by receiving from the user refinements or segment filters.

29 Claims, 14 Drawing Sheets

U.S. PATENT DOCUMENTS

| | | | |
|---|---|---|---|
| 6,636,837 B1 * | 10/2003 | Nardozzi et al. | 705/27 |
| 6,643,661 B2 | 11/2003 | Polizzi et al. | |
| 6,668,273 B1 | 12/2003 | Rust | |
| 6,668,353 B1 | 12/2003 | Yurkovic | |
| 6,697,865 B1 | 2/2004 | Howard et al. | |
| 6,701,311 B2 * | 3/2004 | Biebesheimer et al. | 707/999.003 |
| 6,820,082 B1 * | 11/2004 | Cook et al. | 707/9 |
| 6,871,197 B1 | 3/2005 | Johnson | |
| 6,886,006 B1 * | 4/2005 | Castle | 1/1 |
| 6,912,573 B2 | 6/2005 | Ohkado et al. | |
| 6,915,482 B2 | 7/2005 | Jellum et al. | |
| 6,950,852 B1 | 9/2005 | Kobayaghi et al. | |
| 6,959,268 B1 | 10/2005 | Myer, Jr. et al. | |
| 7,003,546 B1 | 2/2006 | Cheah | |
| 7,003,550 B1 | 2/2006 | Cleasby et al. | |
| 7,054,923 B2 | 5/2006 | Krishnamoorthy | |
| 7,069,511 B2 | 6/2006 | Maritzen et al. | |
| 7,096,218 B2 * | 8/2006 | Schirmer et al. | 707/767 |
| 7,124,355 B1 | 10/2006 | Kukkal | |
| 7,139,978 B2 | 11/2006 | Rojewski et al. | |
| 7,222,369 B2 | 5/2007 | Vering et al. | |
| 7,277,924 B1 | 10/2007 | Wichmann et al. | |
| 7,283,951 B2 * | 10/2007 | Marchisio et al. | 704/9 |
| 7,340,679 B2 | 3/2008 | Botscheck et al. | |
| 7,392,254 B1 * | 6/2008 | Jenkins | 707/999.01 |
| 7,424,438 B2 * | 9/2008 | Vianello | 705/9 |
| 7,448,046 B2 | 11/2008 | Navani et al. | |
| 7,711,694 B2 | 5/2010 | Moore | |
| 7,801,896 B2 * | 9/2010 | Szabo | 707/739 |
| 2001/0047276 A1 | 11/2001 | Eisenhart | |
| 2001/0047293 A1 | 11/2001 | Waller et al. | |
| 2001/0049674 A1 * | 12/2001 | Talib et al. | 707/1 |
| 2002/0049749 A1 | 4/2002 | Helgeson et al. | |
| 2002/0052894 A1 * | 5/2002 | Bourdoncle et al. | 707/513 |
| 2002/0059201 A1 * | 5/2002 | Work | 707/3 |
| 2002/0059379 A1 | 5/2002 | Harvey et al. | |
| 2002/0073114 A1 | 6/2002 | Nicastro et al. | |
| 2002/0087600 A1 | 7/2002 | Newbold | |
| 2002/0111787 A1 | 8/2002 | Knyphausen et al. | |
| 2002/0138331 A1 | 9/2002 | Hosea et al. | |
| 2003/0023662 A1 | 1/2003 | Yaung | |
| 2003/0023677 A1 | 1/2003 | Morison Zuill et al. | |
| 2003/0046401 A1 * | 3/2003 | Abbott et al. | 709/228 |
| 2003/0078810 A1 * | 4/2003 | Cole et al. | 705/3 |
| 2003/0078830 A1 | 4/2003 | Wagner et al. | |
| 2003/0126003 A1 | 7/2003 | vom Scheidt et al. | |
| 2003/0130994 A1 * | 7/2003 | Singh et al. | 707/3 |
| 2003/0135481 A1 | 7/2003 | Helmes et al. | |
| 2003/0135559 A1 | 7/2003 | Bellotti et al. | |
| 2003/0144868 A1 | 7/2003 | MacIntyre et al. | |
| 2003/0154180 A1 | 8/2003 | Case et al. | |
| 2003/0195877 A1 * | 10/2003 | Ford et al. | 707/3 |
| 2004/0088315 A1 | 5/2004 | Elder et al. | |
| 2004/0098467 A1 | 5/2004 | Dewey et al. | |
| 2004/0119738 A1 | 6/2004 | Beringer et al. | |
| 2004/0119752 A1 | 6/2004 | Beringer et al. | |
| 2004/0122693 A1 | 6/2004 | Hatscher et al. | |
| 2004/0122696 A1 | 6/2004 | Beringer | |
| 2004/0122853 A1 | 6/2004 | Moore | |
| 2004/0128156 A1 | 7/2004 | Beringer et al. | |
| 2004/0131050 A1 | 7/2004 | Beringer et al. | |
| 2004/0133413 A1 | 7/2004 | Beringer et al. | |
| 2005/0086204 A1 * | 4/2005 | Coiera et al. | 707/3 |

OTHER PUBLICATIONS

ProjectDash Drives Consistency in Communicating Project Status online Using Innovative Graphical Project Dashboard, Business Editors, Business Wire, New York, Mar. 4, 2002.

"OnlineHobbyist.com," Austin American Statesman, Austin, Texas, Sep. 11, 2000, p. E.1.

"SAP Customers Worldwide Exploit New Business Opportunities With Web-Based Real-Time Business Solutions," (Business Wire. New York, Dec. 8, 1998, p. 1).

"ProjectDash™ lets you know everything is on track," www.idashes.net/projectdash_web.asp, Jun. 2001, iDashes Inc. (2 pages).

"Project Metrics Suggested Categories and Measurements for Organizations Managing Projects," http://amp.stanford.edu/CDMaterials/EPMO/data/Articles/ProjectDash.htm, Copyright Feb. 2001, printed Jul. 28, 2010, iDashes Inc. (1 page).

U.S. Appl. No. 10/628,824, filed Jul. 28, 2003, entitled "Personal Procedure Agent".

U.S. Appl. No. 10/655,783, filed Sep. 5, 2003, entitled "Community Builder".

U.S. Appl. No. 10/657,748, filed Sep. 8, 2003, entitled "Guided Procedure Framework".

U.S. Appl. No. 10/663,343, filed Sep. 15, 2003, entitled "Collaborative Information Spaces".

U.S. Appl. No. 10/663,365, filed Sep. 15, 2003, entitled "Resource Templates".

U.S. Appl. No. 10/663,372, filed Sep. 15, 2003, entitled "Compiling User Profile Information From Multiple Sources".

U.S. Appl. No. 10/663,382, filed Sep. 15, 2003, entitled "Control Center Pages".

PCT International Search Report, mailed Mar. 10, 2005 (3 pages).

Yahoo! (pages documented from the Internet Archive from Dec. 17, 2001: http://web.archive.org/web/20011217201239/http://group.yahoo.com/; http://web.archive.org/web/2001121700856/help.yahoo.com/help/groups/ http://web.archive.org/web/20011202071303/help.yahoo.com/help/us/groups/groups-01.ht...; http://web.archive.org/web/20011202072641/help.yahoo.com/help/us/groups/groups-23.ht...; http://web.archive.org/web/200111127132338/dir.groups.yahoo.com/dir/Hobbies_Crafts/ http://web.archive.org/web/20011125123443/dir.groups.yahoo.com/dir/Hobbies_Crafts/; http://web.archive.org/web/200111125183404/groups.yahoo.com/group/pencil-sharpeners; http://web.archive.org/web/20011121720233/http://people.yahoo.com/).

Neches et al., "Collaborative Information Space Analysis Tools," D-Lib Magazine, Oct. 1998.

Cavalcanti et al., "A Logic Based Approach for Automatic Synthesis and Maintenance of Web Sites," SEKE 2002, ACM, Jul. 15-19, 2002.

Weinberg et al., "Computers in Radiology: MyPACS.net,: A Web-based Teaching File Authoring Tool," The American Journal of Roentgenology, Sep. 2002, Issue 179, pp. 579-582.

Schubert, P. et al., "Virtual Communities of Transaction: The Role of Personalization in Electronic Commerce," Global Networked Organizations, Twelfth International Bled Electronic Commerce Conference, Jun. 1999, Bled, Slovenia, pp. 1-12.

* cited by examiner

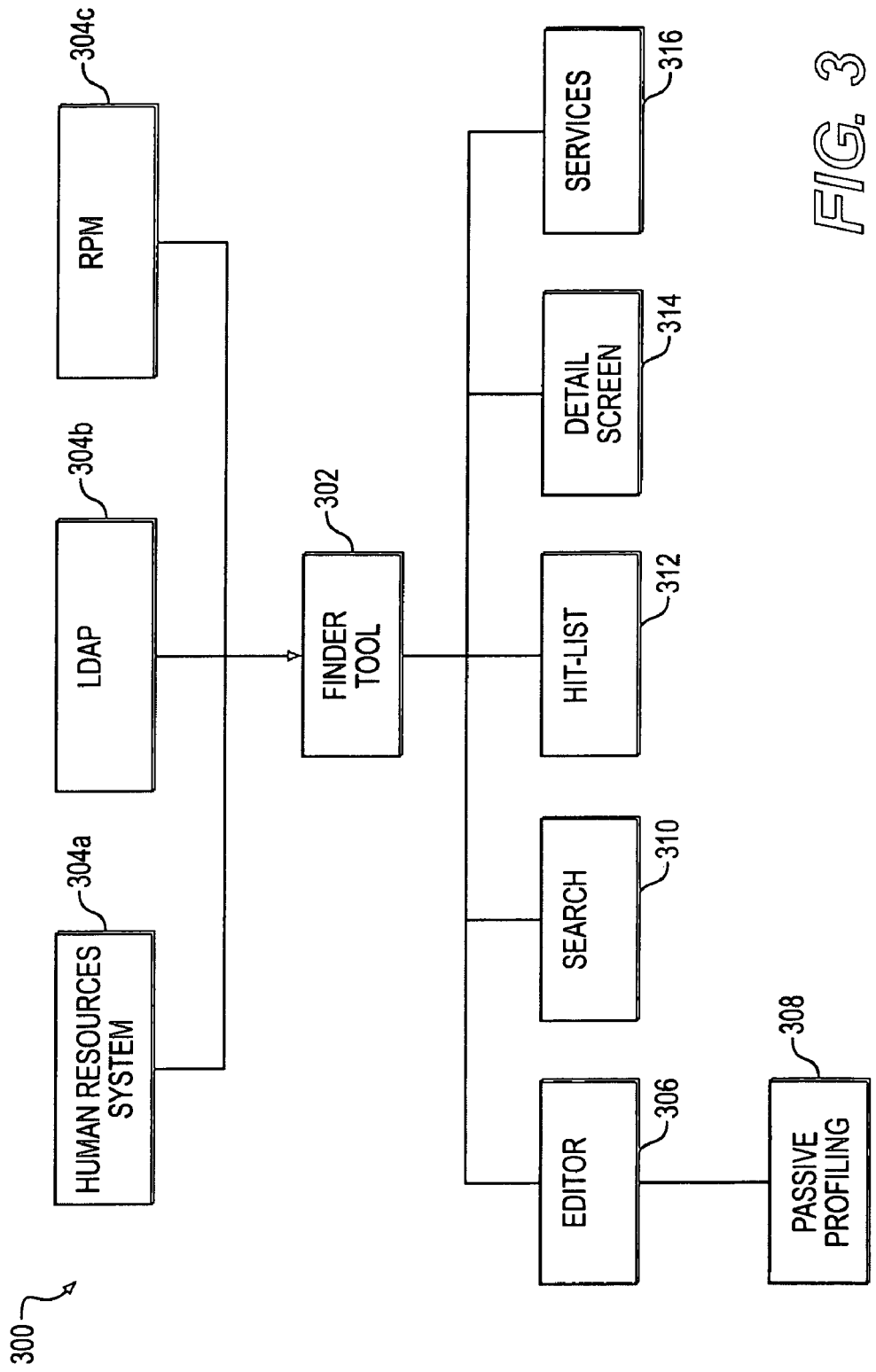

SEARCH PATHS
- FREE TEXT SEARCH FORM
  JAVA DEVELOPMENT, PORTAL,
  EJB, J2EE
  [NEW SEARCH]

SEARCH RESULT — 428

52 MATCHES   SORT BY [NAME ▼]   DETAILS | SHORT | SEGMENT | SHOW AVAILABILITY — 490

☑ NAME: NORMAN MAAG! — 430
    COMPANY: SAP AG LOCATION: GERMANY, WALLDORF DEPARTMENT: xAPPS EPS
    PHONE: +49 6227 7-47474 TERMS: JAVA DEVELOPMENT, PORTAL, EJB, J2EE — 432

☑ NAME: MIKE OHLSEN!
    COMPANY: SAP NORWAY LOCATION: NORWAY, LYSAKER DEPARTMENT: DWP
    PHONE: +47 67529474 TERMS: JAVA DEVELOPMENT, PORTAL, EJB, J2EE

☐ NAME: MARY PETERSON
    COMPANY: SAP NORWAY LOCATION: NORWAY, LYSAKER DEPARTMENT: DWP
    PHONE: +47 67529474 TERMS: JAVA DEVELOPMENT, PORTAL, EJB, J2EE

☑ NAME: STEVE RAYNOLDS
    COMPANY: AUSTRALIA PTY LTD LOCATION: AUSTRALIA, SYDNEY DEPARTMENT: HRCM
    PHONE: +61 3 474 TERMS: JAVA DEVELOPMENT, PORTAL, EJB, J2EE

☐ NAME: LARA THOMMSON
    COMPANY: SAP NORWAY LOCATION: NORWAY, LYSAKER DEPARTMENT: DWP
    PHONE: +47 67529474 TERMS: JAVA DEVELOPMENT, PORTAL, EJB, J2EE

☐ NAME: CHRIS WEBBER ☺
    COMPANY: SAP AUSTRALIA PTY LTD LOCATION: AUSTRALIA, SYDNEY DEPARTMENT: HRCM
    PHONE: +61 3 474 TERMS: JAVA DEVELOPMENT, PORTAL, EJB, J2EE

☐ NAME: BOYD WOODGYER
    COMPANY: SAP AUSTRALIA PTY LTD LOCATION: AUSTRALIA, SYDNEY DEPARTMENT: HRCM
    PHONE: +61 3 474 TERMS: JAVA DEVELOPMENT, PORTAL, EJB, J2EE;

SELECT ALL | DESELECT ALL | SAVE AS RESOURCE | CREATE COMMUNITY | PRINT
                                    424                         422

REFINE RESULTS — 420
- MASTER DATA
  - NAME
  - ADDRESS
  - DEPARTMENT
- QUALIFICATIONS
  - EXPERTISE
  - JOB E [ADD FACET TO REFINE SEARCH RESULT]
  - SKILLS
- ACTIVITIES
- INTERESTS
- COLLABORATIONS

RESOURCES — 426
SHOW [PEOPLE ▼]
  ☐ PERSONAL NETWORK (19)
  ☐ PEOPLE COLLECTION 2 (40)
    ☐ RESULT LIST 1 (12)
    ☐ RESULT LIST 2 (8)
    ☐ RESULT LIST 3 (20)
  ☐ PEOPLE COLLECTION 3 (52)
  [EDIT]

*FIG. 4C*

SEARCH PATHS

- FREE TEXT SEARCH FORM
  JAVA DEVELOPMENT, PORTAL, EJB, J2EE

[NEW SEARCH]

*480*

REFINE RESULTS

- MASTER DATA
  - NAME
  - ADDRESS
  - DEPARTMENT
- QUALIFICATIONS
  - EXPERTISE
  - JOB EXPERIENCE
  - SKILLS — *482*
- ACTIVITIES
- INTERESTS
- COLLABORATIONS

SEARCH RESULT

52 MATCHES   SORT BY [NAME ▽]   DETAILS | SHORT | SEGMENT | SHOW AVAILABILITY

- ☐ NAME: NORMAN MAAGI
  COMPANY: SAP AG   LOCATION: GERMANY, WALLDORF   DEPARTMENT: xAPPS EPS
  PHONE: +49 6227 7-47474   TERMS: JAVA DEVELOPMENT, PORTAL, EJB, J2EE

- ☐ NAME: MIKE OHLSEN!
  COMPANY: SAP NORWAY   LOCATION: NORWAY, LYSAKER   DEPARTMENT: DWP
  PHONE: +47 67529474   TERMS: JAVA DEVELOPMENT, PORTAL, EJB, J2EE

- ☐ NAME: MARY PETERSON
  COMPANY: SAP NORWAY   LOCATION: NORWAY, LYSAKER   DEPARTMENT: DWP
  PHONE: +47 67529474   TERMS: JAVA DEVELOPMENT, PORTAL, EJB, J2EE

- ☐ NAME: STEVE RAYNOLDS
  COMPANY: AUSTRALIA PTY LTD   LOCATION: AUSTRALIA, SYDNEY   DEPARTMENT: HRCM
  PHONE: +61 3 474   TERMS: JAVA DEVELOPMENT, PORTAL DEVELOPMENT, EJB, J2EE

- ☐ NAME: LARA THOMMSON
  COMPANY: SAP NORWAY   LOCATION: NORWAY, LYSAKER   DEPARTMENT: DWP
  PHONE: +47 67529474   TERMS: JAVA DEVELOPMENT, PORTAL, EJB, J2EE

SELECT ALL | DESELECT ALL | SAVE AS RESOURCE | CREATE COMMUNITY | PRINT

SPECIFY SKILLS

SHOW ONLY SKILLS CONTAINING [UI] [OK]

*484*

- ☑ COOPER UI PRINCIPLES
- ☐ UI DESIGN
- ☐ UI METHODS
- ☐ UI TOOLS

*488*                                                    *486*

SELECT AND [REFINE] SEARCH RESULT

PEOPLE COLLECTIONS

- ☐ PERSONAL NETWORK (19)
- ☐ PEOPLE COLLECTION 2 (40)
  - ☐ RESULT LIST 1 (12)
  - ☐ RESULT LIST 2 (8)
  - ☐ RESULT LIST 3 (20)
- ☐ PEOPLE COLLECTION 3 (52)

[EDIT]

*FIG. 4E*

SEARCH PATHS

- FREE TEXT SEARCH FORM
  JAVA DEVELOPMENT, PORTAL,
  EJB, J2EE
- QUALIFICATION > SKILLS
  COOPER UI PRINCIPLES

[NEW SEARCH]

SEARCH RESULT

30 MATCHES   SORT BY [LOCATION ▼]  DETAILS | SHORT | SEGMENT | SHOW AVAILABILITY

456 ——  454 ——

LOCATION:      MATCHES:

☐  ▨   AUSTRALIA, BRISBANE     5         ☺    -
☑  ▨   USA, PALO ALTO          3         3    2
☐  ▨   GERMANY, WALLDORF       21        7    9
☐  ▨   OTHER                   1         -    -

498 ——

458 ——

SELECT AND [REFINE] SEARCH RESULT

PEOPLE COLLECTIONS

- ☐ PERSONAL NETWORK (19)
- ☐ PEOPLE COLLECTION 2 (40)
  - ☐ RESULT LIST 1 (12)
  - ☐ RESULT LIST 2 (8)
  - ☐ RESULT LIST 3 (20)
- ☐ PEOPLE COLLECTION 3 (52)

[EDIT]

REFINE RESULTS

- MASTER DATA
  - NAME
  - ADDRESS
  - DEPARTMENT
- QUALIFICATIONS
  - EXPERTISE
  - JOB EXPERIENCE
  - SKILLS
- ACTIVITIES
- INTERESTS
- COLLABORATIONS

SELECT ALL | DESELECT ALL | SAVE AS RESOURCE | CREATE COMMUNITY | PRINT

*FIG. 4G*

RESOURCE FINDER TOOL

CROSS REFERENCE TO RELATED APPLICATIONS

This application claims the benefit of priority from U.S. Provisional Application entitled "User Productivity Suite," filed Dec. 23, 2002, Application Ser. No. 60/436,219 and U.S. Provisional Application entitled "Resource Finder Tool" filed May 16, 2003, Application Ser. No. 60/471,297.

BACKGROUND

The following description relates to tools that allow a user to locate and group resources relevant to a desired purpose.

Knowledge sharing is considered a relatively important tool for a user to achieve a high level productivity. Many users of conventional business systems may find it difficult to access information and/or tools required to perform a task. For example, the most relevant knowledge required by a user may be stored in resources such as documents, books or in the head of another user or employee. Moreover, even if a user finds the information it is typically difficult to start an effective collaboration to perform a task or project. For example, administrative assistants may need to coordinate several activities to prepare for a customer visit, or a manager may need to access multiple information resources to complete a compensation plan for one or more users, etc. A resource can provide information, which may be found through attributes of the resource.

Recent developments in enterprise management systems have attempted to integrate multiple legacy systems, typically found in existing heterogeneous information technology (IT) environments, into a common enterprise management solution. Such integration technologies frequently fail to deliver a fully integrated platform that also provides sufficient flexibility to adjust to rapidly changing enterprise environments.

SUMMARY

The present application describes systems and techniques relating to locating resources having desired features. The present application describes system and techniques relating to generic search and clustering services for knowledge resources by providing a user interface pattern that is automatically adjusting to the different facets and attributes of the underlying object class.

In one aspect, the system supports the following generic services for any object class that provides facets and attribute information: receiving characteristics of a resource desired by a user; searching a data source of resource profiles associated with each of a plurality of resources for profiles matching the characteristics; providing a hit-list of resources having the desired characteristics; receiving attributes of the resource desired by the user; searching the hit-list for the desired attributes; and providing a narrowed hit-list of resources matching the desired attributes.

The narrowed hit-list of resources may be associated with an existing collection of resources or made persistent as a new collection of resource.

The narrowed listing may be segmented by a common attribute dimension such as location and statistics on the segment provided by the tool.

Other aspects include an article comprising a machine-readable storage medium storing machine-readable instructions that, when executed, cause a machine to perform the disclosed techniques, and/or a system that includes one or more computers configured to implement the disclosed techniques.

The systems and techniques described here may provide one or more of the following advantages. In some implementations, the templates can be provided by the tool or defined by the user. The profiles can be stored by the system and retrieved for repeated usage. A user may save collections either dynamically by storing the query or statically by storing the hit-lists themselves.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 3 is a block diagram of illustrating the functionality of an implementation of a resource finder tool.

FIG. 4A-4J are display screens that may be used with an implementation of a resource finder tool.

Like reference symbols in the various drawings indicate like elements.

DETAILED DESCRIPTION

The systems and techniques described here relate to locating and clustering resources by specifying an attribute profile associated with the resource. A resource may constitute documents, people or users, books and other objects classes that provide a set characterizing attributes and facets. In case of people, for example the person's qualifications, preferences, business context, permission, activities, info needs, and collaboration may be defined as facets within the resource profile. Each facet is providing a set of attributes characterizing the resource in detail. The resource finder tool may be included in a knowledge sharing system that integrated different knowledge sources and needs to provide consistent user interface services across different sources.

To enable effective knowledge sharing, the resource finder tool may allow for the setting up of profiles of the resources, finding resources depending on attributes (e.g., skills of an employee), the possibility of saving a selection of located resources in a collection and serve as the starting point for further handling (e.g., contact, pushing information to targeted people or collaborative work).

The basis of the locating of resources is a resource profile, which is a set of various attributes (e.g., skills of employees). The profile may be set up and maintained manually and/or automatically by, for example, explicit and implicit profiling. A profile may be owned by at least one person. The owner may decide which parts of the profile and may be made public, that is, available for searching.

In some implementations, an approver concept may be employed to help ensure the quality of the attribute values. For example, a change in a person's profile may require approval of the person's boss. In another example, changes to other resource's (e.g., a document) may require approval of the resource owner (e.g., the document creator).

The found resources may be sorted and/or segmented by a discrete value of an attribute and used as a data source for directly connected services. For example, if a found resource is an employee, he/she may be contacted by email, telephone or other communication means to exchange knowledge.

Figure 1:
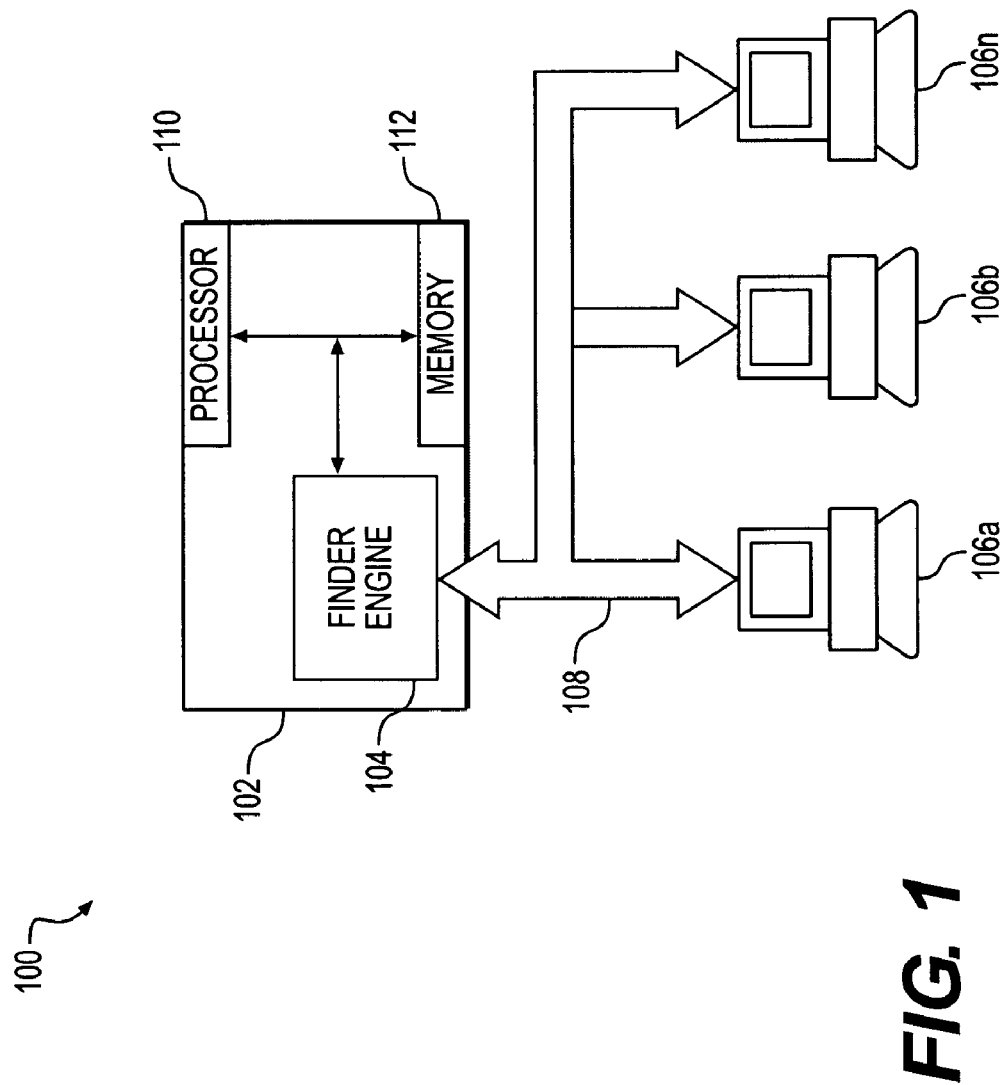
FIG. 1 is a block diagram illustrating a resource finder tool.

FIG. 1 illustrates a block diagram of a computer system 100 that may be used to implement the resource finder tool in a portal environment. The system includes a host server 102 including resource finder software 104 that may accessed by a user using computer devices 106a, 106b, . . . 106n over a network 108.

The resource finder tool 104 may present a user with a template to structure a query for selecting a resource having desired characteristics. The particular user interaction screens presented by the software may be determined by, for example, the host server using known characteristics of the user's identity or role or may be auto-configured depending on the resource type. Thus, the tool may use facets and attributes of the resource type to automatically provide a layout of the screens presented.

The host server 102 may include, for example, a processor 110 and a memory 112. The memory 112 may be configured to include a database for use by the host server to store and retrieve information related to the operation of the host server including execution of the resource finder tool software and to store the characteristics associated with the resources. The network 108 may include a plurality of devices such as servers, routers and switching elements connected in an intranet, extranet or Internet configuration.

The user, for example, an employee, may use a computer device, such as computer 106a, to access the host server 102 over the network 108. The computer device 106a may include a personal computer (PC), personal digital assistant (PDA) or other device using wireless or wired communication protocols to access the host server 102. The computer device 106a may be coupled to I/O devices (not shown) that may include a keyboard in combination with a pointing device such as a mouse to input data into the computer, a computer display screen and/or a printer to produce output from the computer, a storage resource such as a hard disk drive for storing and retrieving data for the computer, and/or other I/O devices.

Figure 2:
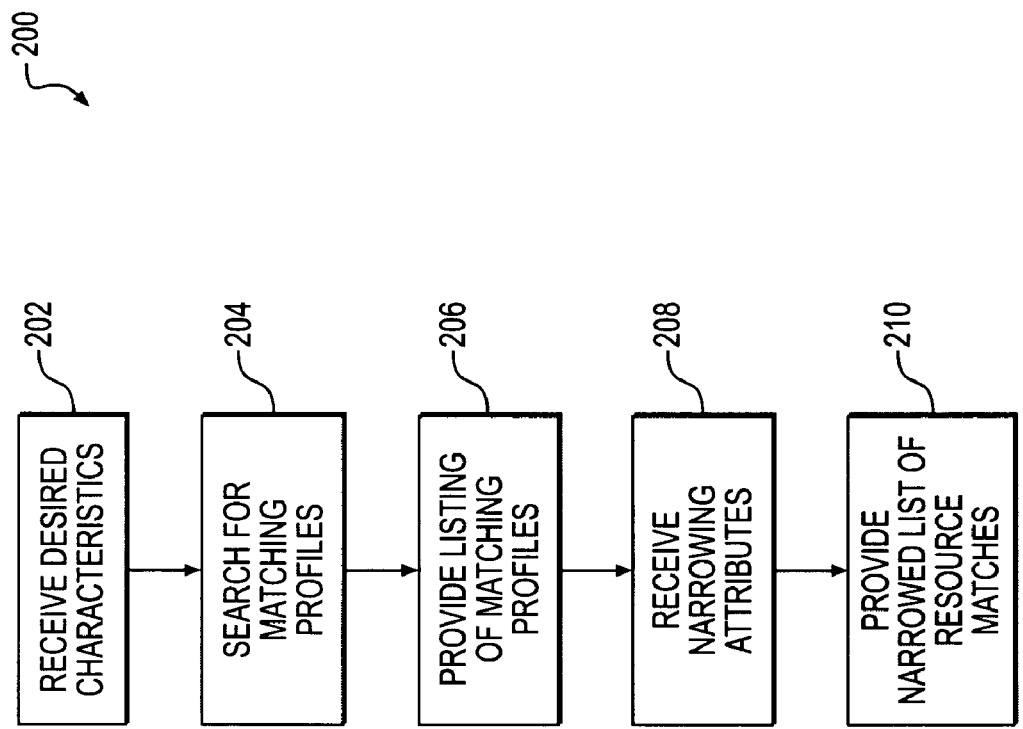
FIG. 2 is a flow chart of a process for implementing a resource finder tool.

FIG. 2 is a flow chart 200 of an implementation of the resource finder in a portal environment using the example of a people resource. A portal environment may be, for example, a website featuring a suite of commonly used services, serving as a starting point and frequent gateway to the Internet, an intranet or a niche topic (vertical portal). Portal services may include a search engine for unstructured information or structured resources such as the resource finder. In an implementation, a portal personalized for an employee may include links to worksets of the employee, an inbox, a personal profile, ongoing work, and resource finder templates.

The resource finder tool receives 202 a template of desired characteristics of a resource. The characteristics may be free text provided by a user of the resource finder desiring a resource having the provided characteristics. The search template may be defined by the tool user or pre-defined and available for selection by the user. The text may be entered in free form, which may be parsed by the finder tool and used as search criteria for matching resource profiles.

The resource finder tool searches 204 a data source of resource profiles for profiles that match the desired profile characteristics. The matches may not necessarily be exact matches. The resource finder tool may be implemented to retrieve from the data source resources that are near matches.

The matches and near matches may be provided 206 as an initial hit-list of matching resources to the tool user.

The resource tool may then receive 208 a list of refining attribute specifications to narrow the initial list. The tool user may have specified a profile that matches a large number of resources, for example, to see a wide range of available resources or to gain general understanding of the resources available. For example, a resource that is a person may have an experience facet that includes several attributes that describe that person's areas of expertise. Other attributes that characterize a person resource may include licenses received, papers published, languages spoken, demographic information, title in an organization, activities and collaborations. The resource may be a document. In that case, the attributes may include the topic, title, date of publication, where published, author, author's personal data, and people who have read the document. The refining attribute specifications select from the initial list a shorter, narrowed list that may then be provided 210 to the tool user as a new match list.

FIG. 3 is a block diagram 300 of an implementation of the resource finder tool illustrating functionality and interfaces with other systems. The resource finder tool 302 may associate resources with a set of facets and attributes together with descriptions how these attributes are fed from original data sources 304. The data sources may be existing structured or unstructured data. For example, a human resources (HR) system 304a may have fields in an employee database that may be parsed to find biographical data associated with an employee resource. In another example, a lightweight directory access protocol (LDAP) system may be used to parse profile data from unstructured sources such as emails, documents and network data sources.

In an implementation, the resource finder tool may provide display screens to enable a user to profile a resource. A profile editor 306 may be provided to enable a user to display and edit his or her own profile. Passive profiling 308 also may be enabled and displayed in the profile editor display. Passive profiling is an automated method of producing a profile using data that is stored in other data sources and existing documents and integrated in the resource's profile.

A search entry display 310 may be provided to enable a user to enter terms for a resource query to locate desired resources. The search entry display may include a free-text search, pre-defined search templates that may be selected, user-defined template and search by attributes. In an implementation, the user also could query different types of objects at the same time. This multi-resource query form may be arranged to enable the user to select the resource object types (e.g., document, books, people) to query.

The resource finder tool may be arranged to provide a hit-list 312 display of located resources. The hit-list display may include links to allow contact with the located resources, if available. The hit-list display may enable a user to define a subset of the hit-list to combine into a collection. The term "collection" refers to a collection (e.g., a set) of resources (e.g., objects) that may be defined by a user of the finder tool. In an implementation, the collection may be created when the user saves all or part of the hit-list. A user may save collections either dynamically by storing the query or statically by storing the hit-lists themselves. A hit-list that is stored dynamically may vary over time due to changes in the resources that are located. A hit-list that is stored statically is a snapshot of the located resources at the time the query was executed. In an example of a dynamic collection, if there is a new company policy related company cars, a user may store the query "all employees who currently have a company car." The resultant hit-list may vary over time as employees receive or lose company cars. When a future policy is to be distributed, the same query may return a different hit-list. In this example, the target group, possessors of company cars, may return a different hit-list. The target group, possessors of company cars, was the desired hit-list. Alternatively, a user may want to store a static collection. For example, if a user conducts a survey. If the user repeats the survey, the user may want to have the same target group as in previous surveys to make the results comparable. The resource finder tool also may enable a user to combine the results of more than one search into a collection. In an implementation, the hit-list display 312 also may enable a user to refine the search or to segment the entries on the hit-list that share a desired attribute value. In some implementations, the user can return to a prior search.

A detail screen 314 may provide details of a located resource. For example, a hit-list may locate and display limited data about a resource because of the limited display area. An employee located as a resource may, for example, display only the employees name and department. Selecting the employee from the hit-list may invoke the detail screen, which is generated based on the facets and attributes that are specified in the profile of this resource type. The detail screen also may include navigation controls to enable a user to return to the hit-list, contact the resource or resource holder, or return to a previous search result.

A services screen 316 may be provided to enable additional actions with the located resources. For example, in an implementation, the services screen for a hit-list of employee resources may provide a link to contact employees, to push information to the employees, survey the employee's opinions on a topic, to provide e-learning to employees having a common interest, to associate the employees into a community of people having a common interest, to provide the employee with a task and provide a task-related procedure to aid in guiding the employee to completion of the task. This would allow you to run services, like starting a collaboration room already prefilled with everything you have gathered in a collection.

Figure 4A:
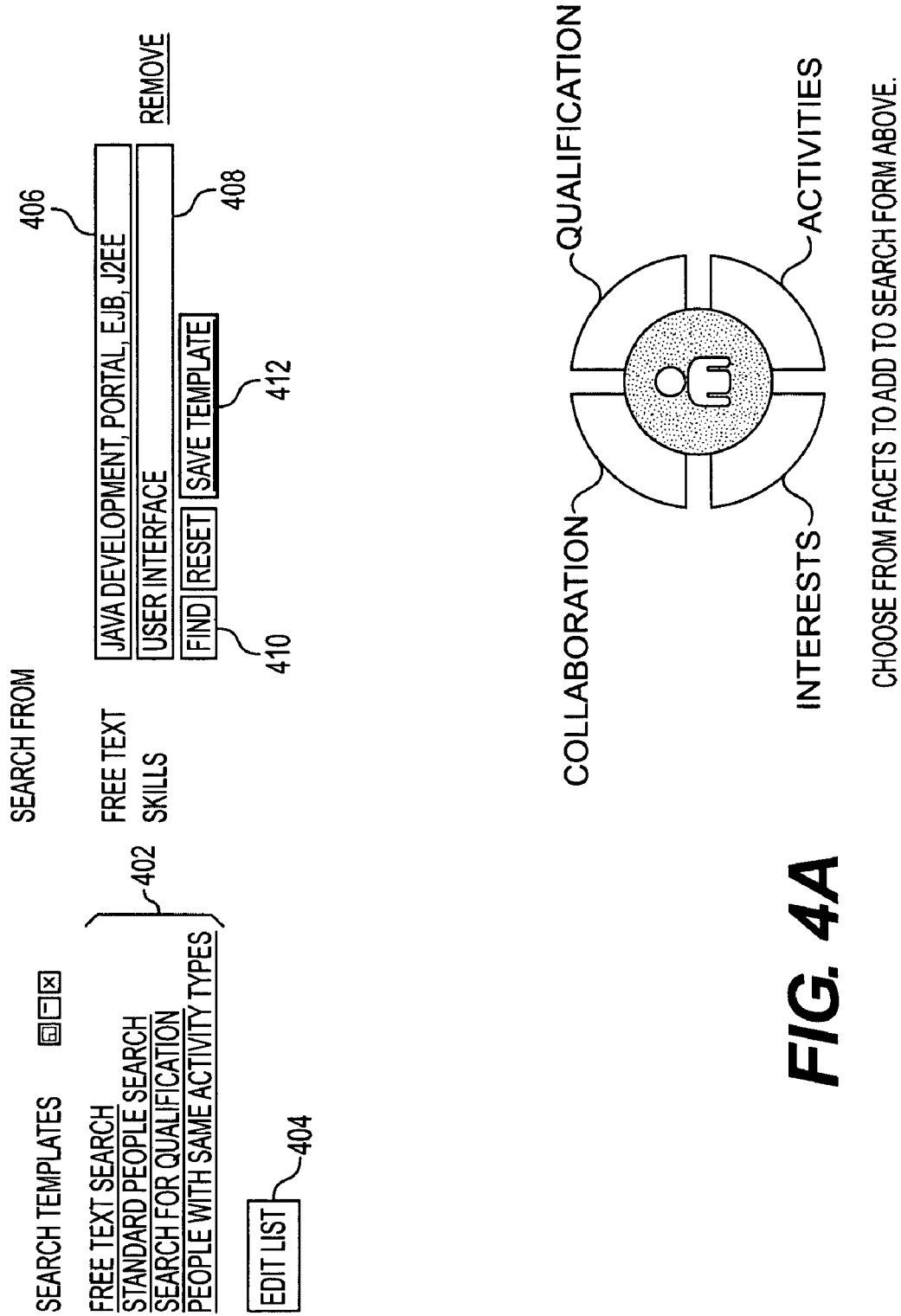

FIG. 4A illustrates an implementation of a user interface (UI) free-text search screen template that may be provided by a resource finder tool. Other search templates 402 may be provided. The UI of the tool may be auto-configured depending on the resource type. The resource finder tool may use facets and attributes of the resource type to automatically provide a layout of the search screen. The tool also may use the resource type to auto-layout the refinement views, segment views, and other displays and sub-displays described below. For example, a search template may be provided to aid a user in searching for people, resources by qualification or people sharing the same activity types. The list of search templates may be edited 404 to add additional user-defined templates or alter the existing templates. A free-text search field 406 may be provided where the user may provide key words that the user believes are associated with a desired resource. A skills field 408 may be provided for searching for one or more specific requirements of the resource. A button 410 may be provided to instantiate a search. The current free-text search screen entries may be saved for repeated use as a template 412.

Figure 4B:
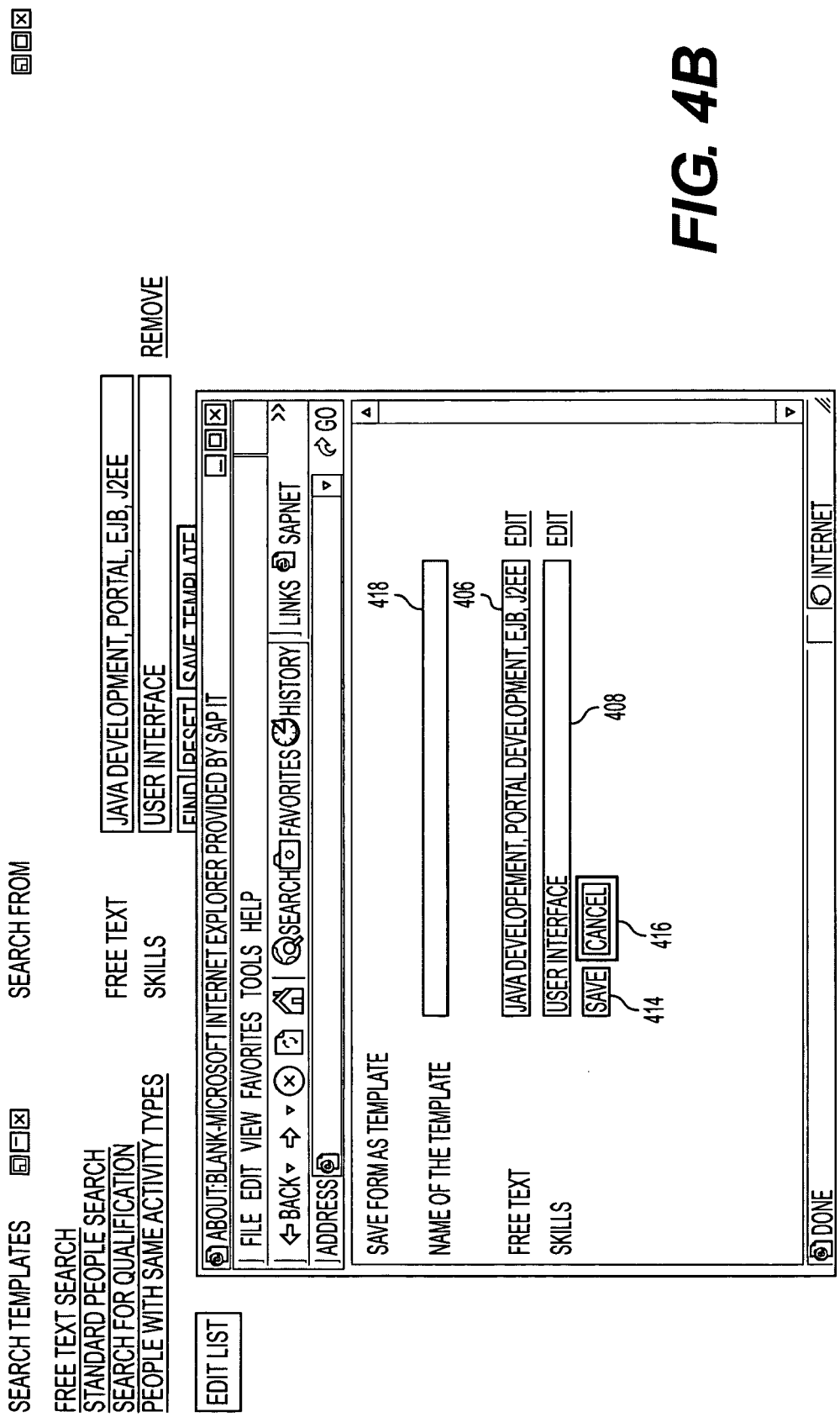

FIG. 4B illustrates an implementation of a display for saving a search screen as a template. The save-template display includes the free text 406 and skills 408 for viewing and editing. The user may save 414 or cancel 416 the search screen as a template. A name field 418 may be provided to enable the user to enter a description for the saved template.

FIG. 4C illustrates an implementation of a search-result (hit-list) display resulting from the search criteria of FIG. 4A. The user may select the types of resource results to show 426 and may select an ordering 490 of the hit-list. In the illustrated display, the user has elected to show people resources. The user may select other, or additional, resources, for example, documents. In an implementation, the user can store heterogeneous items in one collection. That is, the user may store documents, people, books, or other resource objects that are associated with the same query or topic in one collection. The hit-list may include the resource name 428 and some information 432 about the resource. The information 432 illustrated may be, for example, attributes of a master data facet, which includes biographical information. A select-box 430 may be provided to enable the user to manually select a subset of the hit-list. The selected subset may be saved as an aggregated resource 424, described below. The aggregated resource is a retrievable listing of resources that the user may recall without having to repeat the search. The selected subset may also be associated with a community 422. A community is a group of people sharing a common interest, skill or other attribute. Communities may be useful to organize people resources into groupings. Thus, based upon a resource's attributes, a resource may be a member of more than one community.

Figure 4D:
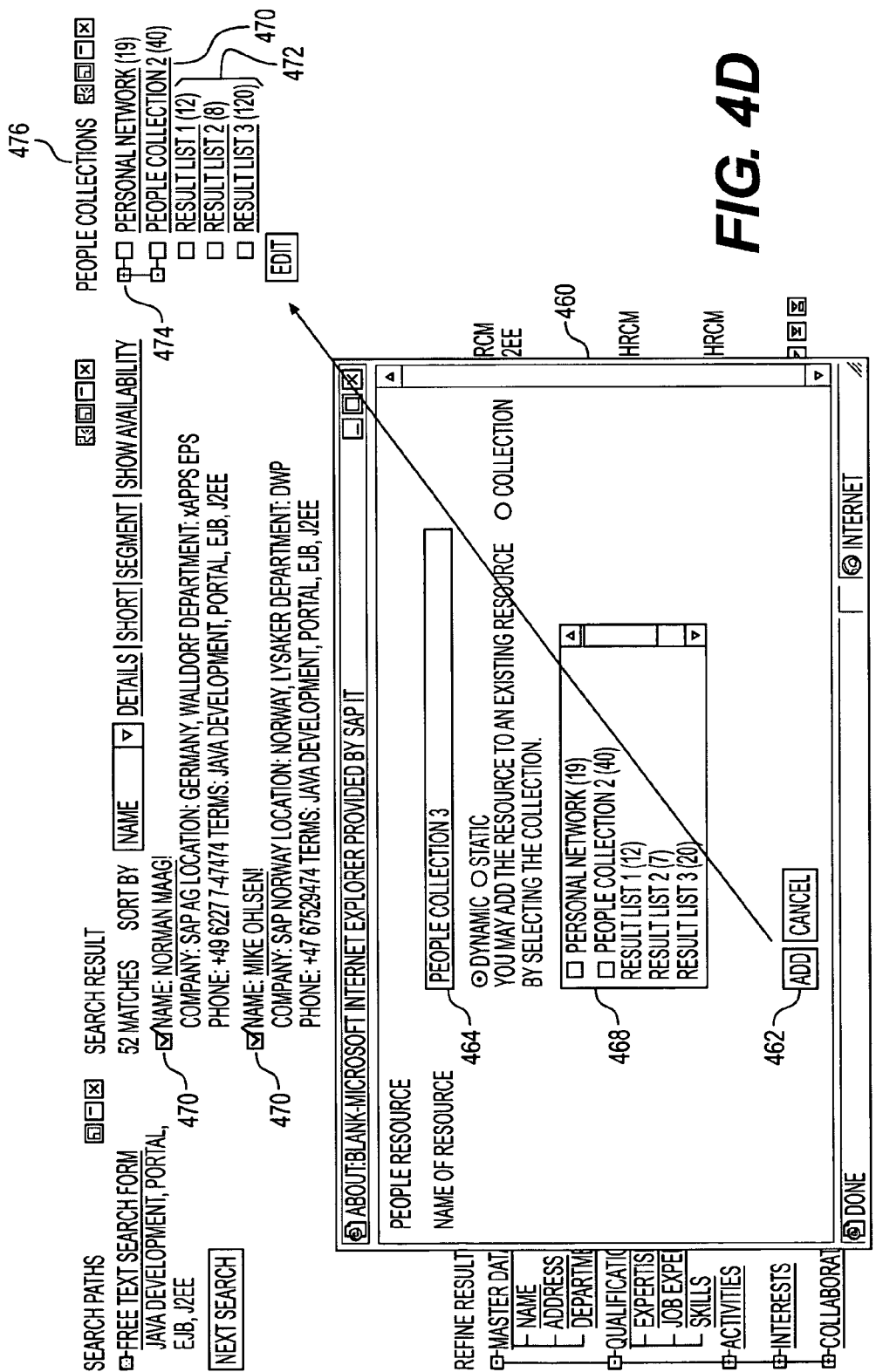

FIG. 4D illustrates an implementation of a pop-up display 460 for saving selected resources. Resources selected 470 may be saved as a named resource for later retrieval or use. The selected resources may be saved as a new collection of resources and provision may be made to name 464 the new collection. The new collection name 464 can be added 462 to an existing list of resource collections 476. In an implementation, the display 460 provides a list 468 of existing resource collections to which the selected resources may be aggregated. The existing resources list 468 also may be displayed 476 by the resource finder tool. A collection may be part of a user's personal network 474 or included as a resource collection 470. The resource finder tool may include a history of result lists 472 that have been aggregated into a collection 470. Thus, result lists 472 can provide for tracking of resources that have been aggregated in a collection. Each result list also may be removed as a group from the collection.

FIG. 4E illustrates an implementation of a display wherein the user may narrow a list of people resources by selecting facets 480 of attributes associated with the resource. The attributes may be organized into facets including master data, qualifications, activities, interests and collaborations. In an implementation, the master data facet relates biographical/demographic data to the resource and may include name, address, department, phone number, location and related information. The qualifications facet relates topical knowledge to the resource and may include expertise, experience, skills, abilities/competencies, licenses, certificates and aspirations. The activities facet relates involvements to the resource and may include portal roles, current activity, history, workload, worksets, and projects. The interests facet relates objects associated with the resource and may include community memberships, subscriptions, personal interests and business interests, queries/view, search domains and communication channels. Subscriptions are documents to which a user has requested notification upon change or new upload. Search domains are pre-defined repositories that default search (TREX) would parse. For example, a sales person may search a domain that includes sales materials, product rollout information and databases of reported customer problems. A development manager may search a domain that includes product development specifications and white papers. The domains may be pre-configured in workset definitions and automatically personalized for users having that workset assigned to them. Business interests may include key figures, which may be key performance indicators based on a user's workset, job description or role. For example, a sales person may be interested in sales margins. The collaborations facet relates collaborative efforts to the resource and may include private information collections (for example, my Guru page, my collected resources for others, my best publications), personal networks (for example, the people a user may be working with or whose opinion is respected, preferred or trusted colleagues), published resources and memberships.

As an example, a user may refine a hit-list by selecting an attribute such as "skills" 482 associated with the resources on the hit-list. The display may provide a text-entry window 484 for entry of user-selected criteria to refine the hit-list. In an implementation, the resource finder tool provides a window 486 having selectable standardized entries based upon the specific facet and attributes that are interactive with the user-selected criteria. That is, the user-selected criteria may be used as a generic search interaction pattern to which the tool can provide standardized entries from specific facets and attributes of a resource type. In the example illustrated, in response to the user-selected text of "UI," the tool has provided standardized attributes associated with the user-selected text. A user may mark 488 the attributes desired in the resource. In the illustrated example, the user has selected "Cooper UI Principles."

Figure 4F:
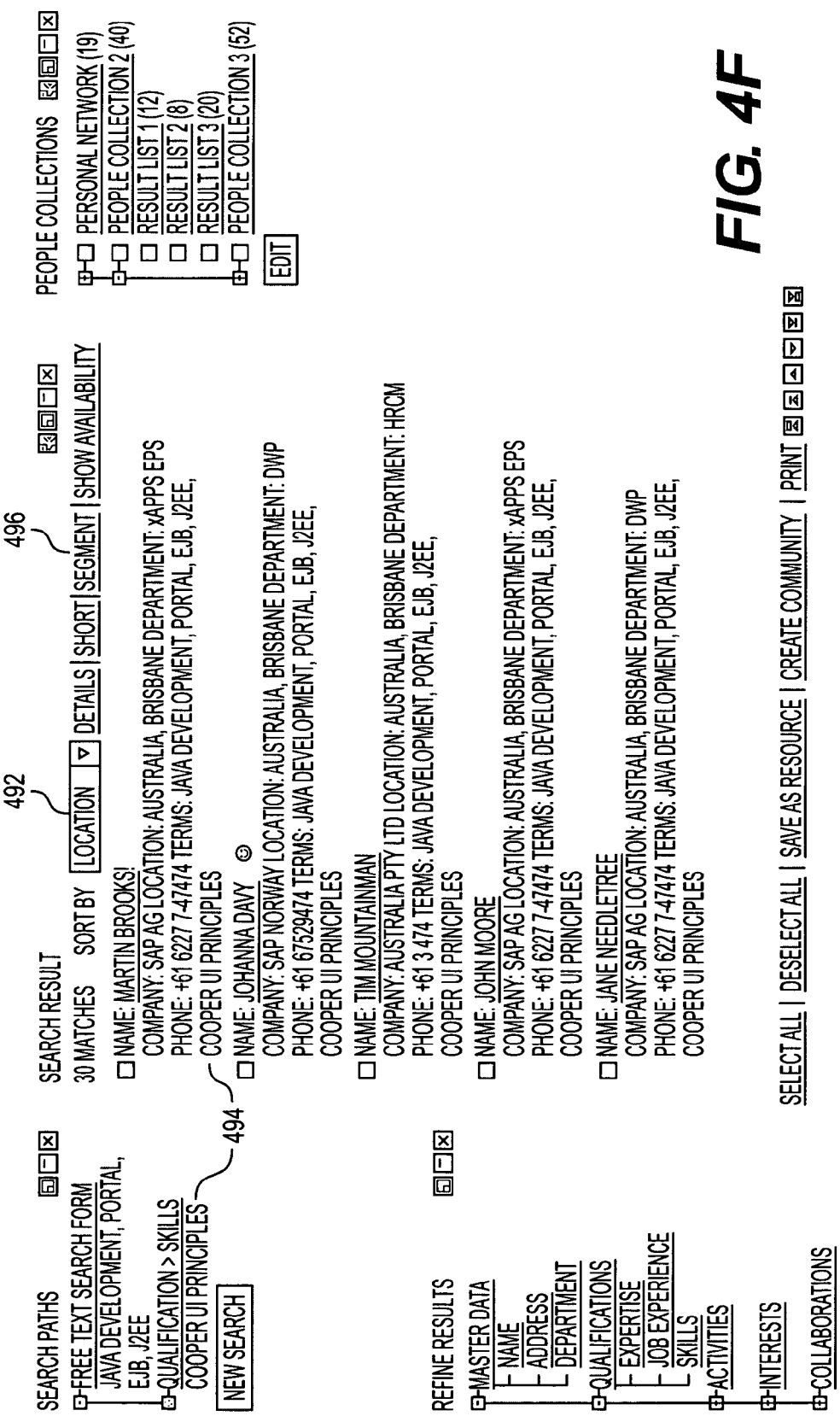

FIG. 4F illustrates a possible refinement view of the example of FIG. 4E. Each of the resources remaining on the narrowed hit-list has the user-selected skill 494. In this example, the user has also reordered the resource listing by location 492. The user may continue to narrow the resource listing to provide resources that match other desired characteristics. For example, the user may desire to segment 496 the resource listing by a discrete value of a resource attribute such as location.

FIG. 4G illustrates an implementation of a segment view by location of the narrowed hit-list of FIG. 4F. The display may provide characteristics of the segments. In the example, the segment view lists the locations 456 of the resources and matches 454 at that location. Statistics associated with the segment such as a pictorial 498 representation of matches at each discrete value or the number of the located resources that are available. The user may select 458 one of the segments to narrow the hit-list.

Figure 4H:
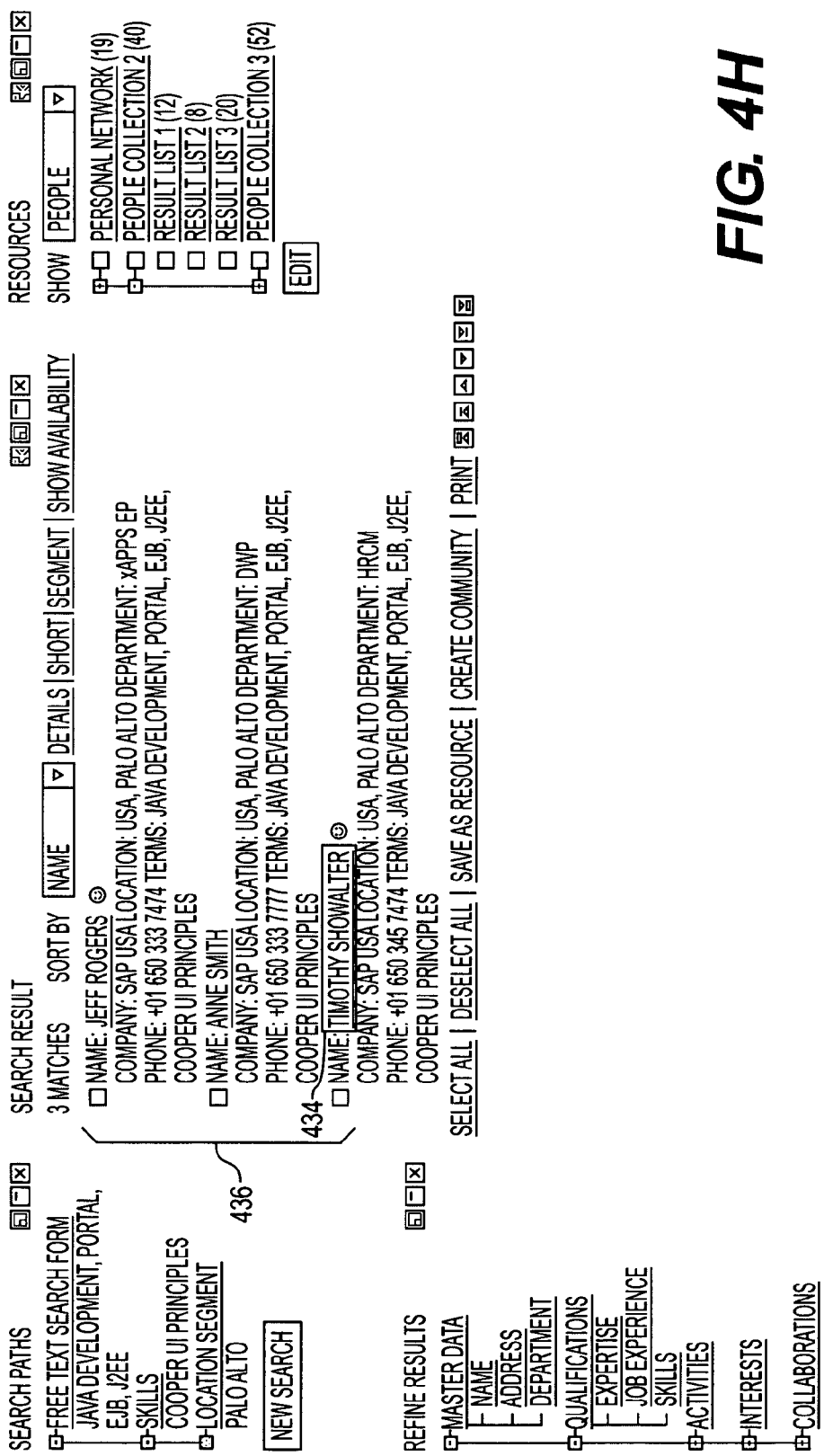

FIG. 4H illustrates an implementation of a display of the resources in the segment selected in the example of FIG. 4G. Thus, in this example, the user has been provided with a refined list 436 of resources associated with a desired category of interest having attributes related to a narrowed characteristic and available in a desired location. The user may select a particular resource 434 to see more detailed information about the resource.

Figure 4I:
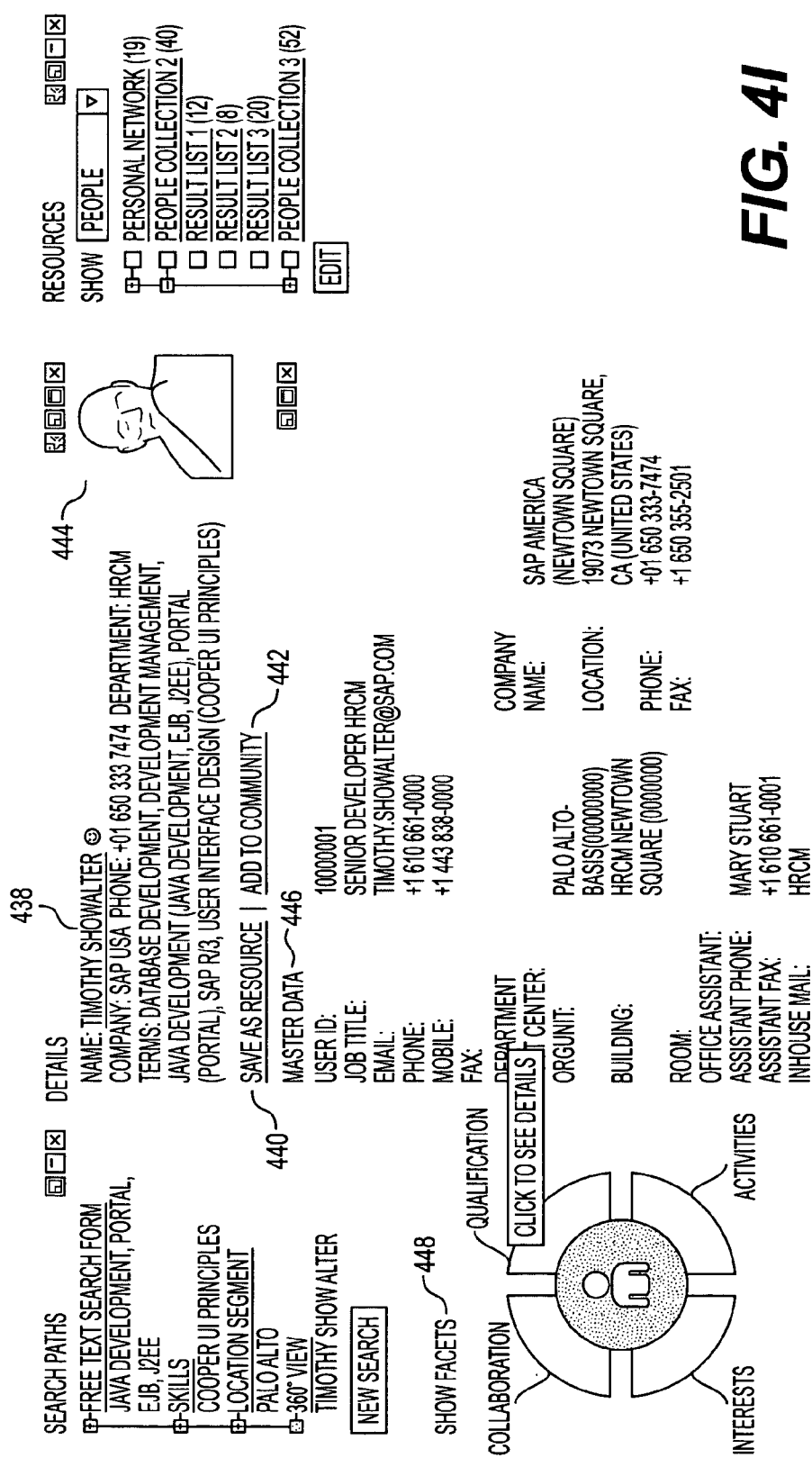

FIG. 4I illustrates an implementation of a resource detail display. In the illustrated detail screen, the resource name 438 may be displayed and a photograph 444. The detail screen may, in an implementation, default to master data 446 about the resource. The user may be offered the opportunity to save the resource 440 or add to the resource to an existing collection 442. In some implementations, a resource that is viewed in the detail display may be automatically saved in a list of candidates to help the tool user to remember inspected items and to serve as a starting point for further actions. For example, in a multi-resource query, a list of found resource(s) may subsequently be used to run services such as starting a collaboration room pre-filled with resources gathered in a collection. The user also may elect to show another facet 448 of the resource. The user may elect to show one of qualifications, activities, interests and collaborations. In the sample display, the user has selected the qualifications facet.

Figure 4J:
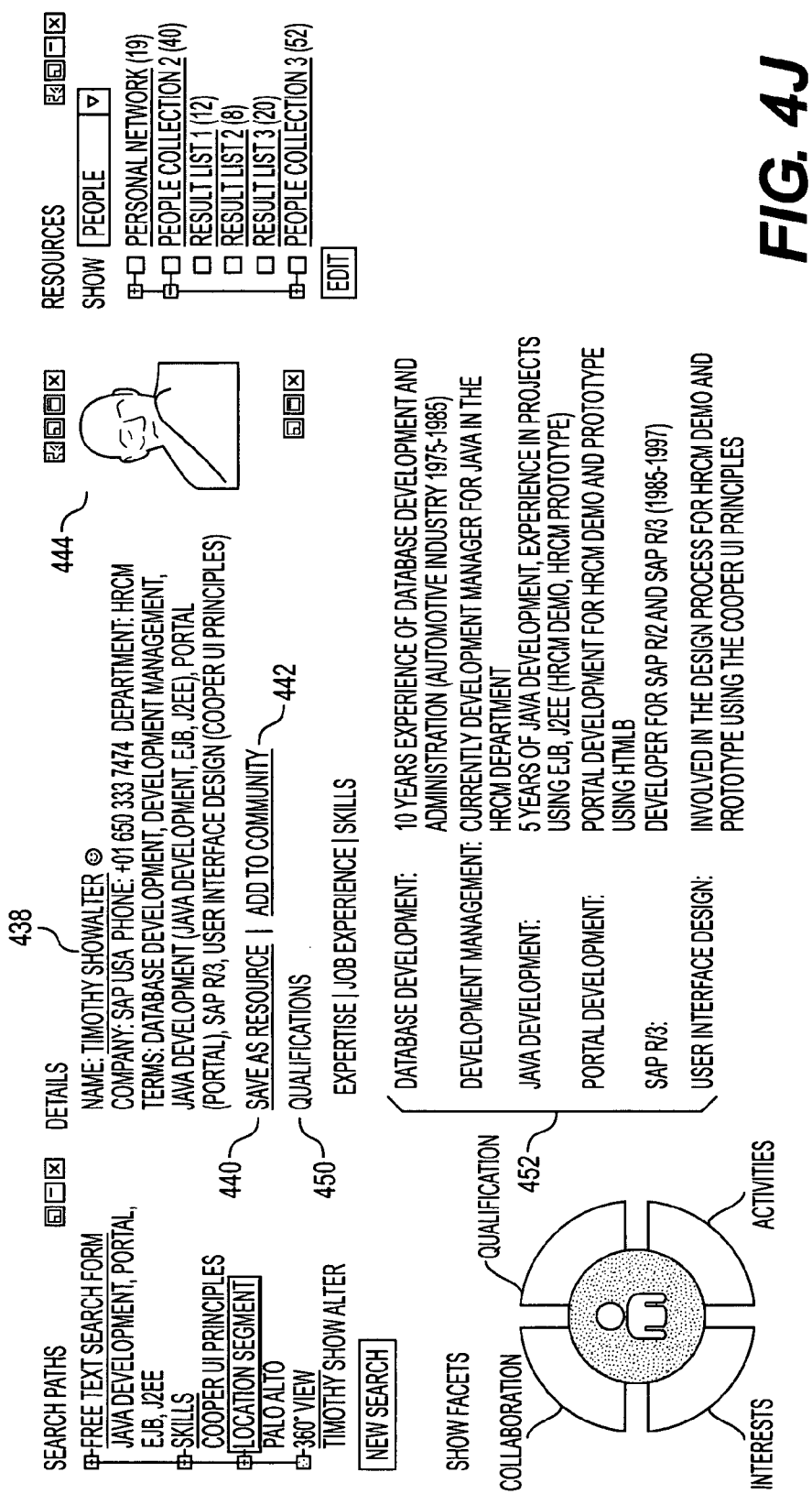

FIG. 4J is an illustration of an implementation of a resource detail display having the qualifications facet of a resource. The display may continue to show the resource name 438 and picture 444. The detail display also may allow the user to save the resource and/or add the resource to a collection. The display shows the qualifications facet 450 of the resource. The facet includes expertise, job experience and skills. A qualifications listing 452 may provide a summary of the qualifications of the resource. The qualifications facet also include, for example, licenses, education, and awards.

Figure 5:
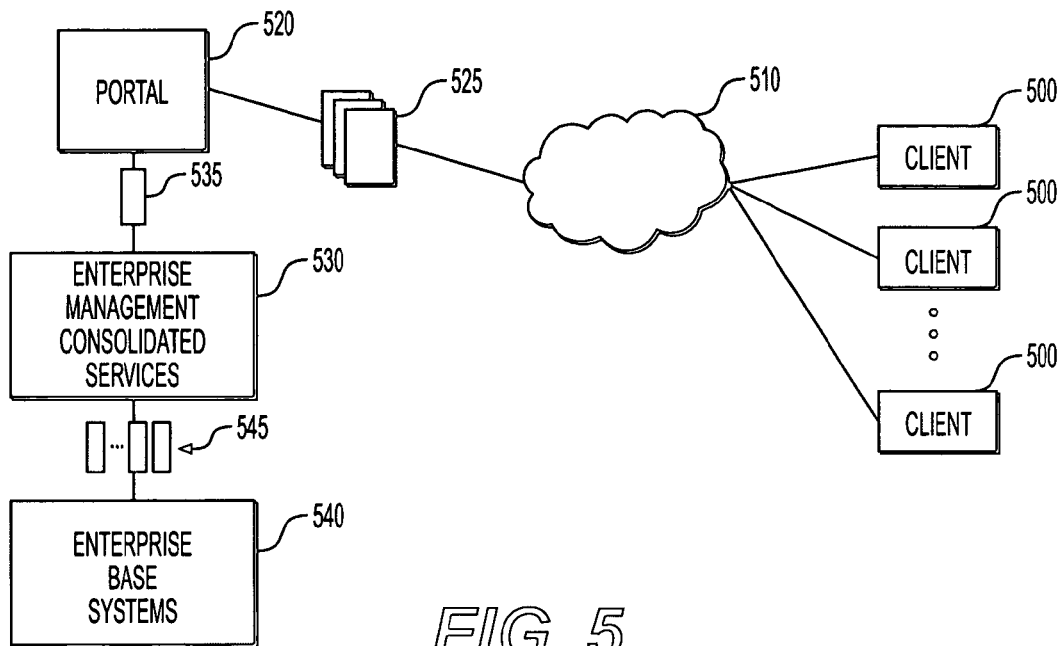
FIG. 5 is a block diagram illustrating an example of an integrated enterprise management system.

FIG. 5 is a block diagram illustrating an example integrated enterprise management system. Multiple clients 500 can access data over a network 510 through a portal 520. The network 510 can be any communication network linking machines capable of communicating using one or more networking protocols, e.g., a local area network (LAN), a wide area network (WAN), an enterprise network, a virtual private network (VPN), and/or the Internet. The clients 500 can be any machines or processes capable of communicating over the network 510. The clients 500 can be document browser applications (e.g., a Web browser) and can be communicatively coupled with the network 510 through a proxy server.

The portal 520 provides a common interface to various services. The portal 520 receives requests from the clients 500 and generates information views 525 (e.g., Web pages) in response. The portal 520 can implement a user roles based system to personalize the common interface and the information views 525 for a user of a client 500. A user can have one or more associated roles that allow personalized tailoring of a presented interface through the generated information views 525.

The portal 520 communicates with an enterprise management system 530 that consolidates multiple application services. The portal 520 receives data 535 from the enterprise management system 530 for use in fulfilling the requests from the clients 500. The enterprise management system 530 can provide integrated application services to manage business objects and processes in a business enterprise. The business objects and processes can be resources (e.g., human resources), development projects, business programs, inventories, clients, accounts, business products, and/or business services.

The enterprise management system 530 communicates with enterprise base systems 540 to obtain multiple types of data 545. The enterprise base systems 540 can include various existing applications and systems, such as human resource management systems, customer relationship management systems, financial management systems, project management systems, knowledge management systems, business warehouse systems, time management systems, and electronic file and/or mail systems. The enterprise base systems 540 also can include an integration tool, such as the eXchange Infrastructure (XI) provided by SAP of Walldorf, Germany. The enterprise management system 530 can consolidate and integrate the data and functionality of such systems, in a heterogeneous information technology (IT) environment, into a single enterprise management tool.

This enterprise management tool can include systems and techniques to facilitate creation of new applications within the enterprise management system 530. These new applications can readily draw on the resources of the enterprise base systems 540 to cross over traditional enterprise application boundaries and handle new business scenarios in a flexible and dynamic manner, allowing rapid and continuous innovation in business process management. A virtuous business cycle can be created using such cross-applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 530 using customized cross-applications. The stages can provide and consume determined services that can be integrated across multiple disparate platforms.

The portal 520, enterprise management system 530 and enterprise base systems 540 can reside in one or more programmable machines, which can communicate over a network or one or more communication busses. For example, the base systems 540 can reside in multiple servers connected to an enterprise network, and the portal 520 and the enterprise management system 530 can reside in a server connected to a public network. Thus, the system can include customized, Web-based cross-applications, and a user of the system can access and manage enterprise programs and resources using these customized Web-based cross-applications through a single portal from anywhere that access to a public network is available.

Figure 6:
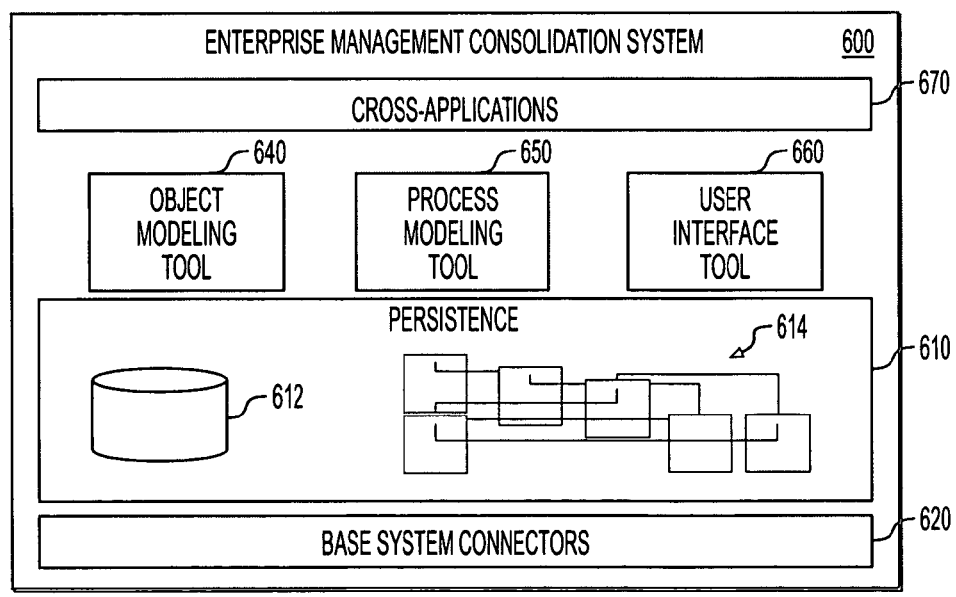
FIG. 6 is a block diagram illustrating components of an example enterprise management consolidation system.

FIG. 6 is a block diagram illustrating components of an example enterprise management consolidation system 600. The system 600 can include a persistence layer 610 and one or more base system connectors 620. The base system connectors 620 enable data exchange and integration with base systems. The base system connectors 620 can include a BC (Business Connector) interface, an ICM/ICF (Internet Communication Manager/Internet Communication Framework) interface, an Encapsulated PostScript® (EPS) interface, or other interfaces that provide Remote Function Call (RFC) capability.

The persistence layer 610 provides the enterprise management consolidation system 600 with its own database 612 and data object model 614. The database 612 and the object model 614 provide a consolidated knowledge base to support multiple enterprise management functions, including functions created as cross-applications 670. One such function can be tools that allow a user to locate and group resources relevant to a desired purpose, as described above. Active communication between the persistence layer 610 and the base systems can provide a tight linkage between real-time operational data from multiple base systems and an integrated enterprise management tool to allow strategic enterprise management and planning. One of the cross-applications 670 can be a Resource Finder Tool application.

The data object model 614 can represent a subset of data objects managed by the base systems. Not all of the data aspects tracked in the base systems need to be recorded in the data object model 614. The data object model 614 may have defined relationships with data objects stored in the base systems, for example, certain objects in the data object model 614 may have read only or read-write relationships with corresponding data objects in the base systems. These types of defined relationships can be enforced through the communication system built between the persistence layer 610 and the base systems. Thus, the persistence layer 610 can be used to effectively decouple application development from the underlying base systems.

The cross-applications 670 can take advantage of this decoupling from backend systems and can be created using a set of tools that enable efficient development of cross-applications 670, which can drive business processes across different platforms, technologies, and organizations. The cross-applications 670 can support semi-structured processes, aggregate and contextualize information, tackle event-driven and knowledge-based scenarios, and support a high degree of collaboration in teams, including driving collaboration and transactions. The set of tools enable efficient development of the cross-applications 670 by providing application patterns that support model-driven composition of applications in a service-oriented architecture.

An object-modeling tool 640 enables creation of new business objects in the persistence layer 610 by providing a mechanism to extend the data object model 614 dynamically according to the needs of an enterprise. A process modeling tool 650 enables creation of new business workflow and ad hoc collaborative workflow. A user interface (UI) tool 660 provides UI patterns that can be used to link new objects and workflow together and generate standardized views into results generated by the cross-applications 670. The object modeling tool 640, the process modeling tool 650 and the UI tool 660 can thus be used to build the components of cross-applications 670 to implement new enterprise management functions without requiring detailed coding activity.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or resource-oriented programming language, and/or in assembly/machine language. As used herein, the term "machine-readable storage medium" refers to any apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments may be within the scope of the following claims

What is claimed is:

1. A method comprising:
   storing a data source of resource profiles associated with a plurality of resources, each resource being at least one of a plurality of resource types;
   receiving, through a user interface, one or more first attributes of a resource desired by a user, wherein receiving attributes comprises receiving a search template from the user and the search template is auto-configured based on the resource type, attributes, or facets;
   searching, using a processor, the data source of resource profiles for profiles having one or more of the first attributes;
   providing, to the user, a hit-list of resources having the one or more first attributes;
   receiving one or more second attributes of the resource through a refinement user interface;
   searching, using a processor, the hit-list for resources having the one or more second attributes;
   providing, to the user, a narrowed hit-list of resources having the one or more first and second attributes;
   storing the hit-list as a collection of resources which is used for further actions or stored as a persistent collection,
   automatically creating two or more segments of the narrowed hit-list by grouping the resources according to one of a plurality of attribute dimensions generating, for the user, statistics associated with the segments;
   receiving a selection of two or more segments through the user interface;
   providing, to the user, a subset of the narrowed hit-list based on the selected two or more segments; and
   using the hit-list to create a community, the community only including users sharing the first attribute.

2. The method of claim 1, further comprising:
   displaying, in response to a user query, resources of the hit-list for user inspection;
   maintaining a list of resources displayed for inspection by the user;
   displaying a search history of search queries previously entered by a user, including a list of resources previously displayed;
   allowing the user to back-navigate to a search within the search history by displaying the corresponding hit-list; and
   displaying the list of inspected resources as the hit-list.

3. The method of claim 1, comprising defining the resource profiles by facets, attributes, and descriptions of the sources of the attributes.

4. The method of claim 3, comprising generating a pattern-based user interface of a search tool from the resource profile.

5. The method of claim 1, further comprising:
   receiving at least one selected resource type;
   providing a second narrowed hit-list of resources having the selected resource type from the narrowed hit-list;
   storing the second narrowed hit-list as a second collection of resources for using for further actions or storing as a persistent collection.

6. The method of claim 5, comprising storing the collection of resources dynamically or statically.

7. The method of claim 1, further comprising aggregating the narrowed hit-list with an existing collection of resources.

8. The method of claim 7, wherein the existing collection of resources comprises an historical listing of aggregated narrowed hit-lists.

9. The method of claim 1, wherein the search template is defined by the user.

10. The method of claim 1, wherein the search template comprises a multi-resource query that returns resources of more than one resource type.

11. The method of claim 1, comprising saving and re-using the search template.

12. The method of claim 1 further comprising providing contact information in response to a user query to enable communication with resources in the community.

13. The method of claim 1, wherein the narrowed hit-list is displayed based on the resource type.

14. The method of claim 1, wherein the resource type is a person and the attributes include at least one of licenses received, papers published, languages spoken, demographic information, title in an organization, activities.

15. The method of claim 1, wherein a plurality of selected resource types are received through the refinement user interface.

16. The method of claim 1, further comprising:
   combining the stored collection of resources with a second collection of resources to create a fifth collection of resources.

17. The method of claim 5, further comprising:
   storing the second collection of resources by selecting a subset of the second narrowed hit-list.

18. The method of claim 1, wherein the collection of resources is stored under a name provided by a user.

19. The method of claim 5, wherein the second narrowed hit-list includes heterogeneous resources.

20. The method of claim 3, wherein the facets include at least one of collaboration, qualification, interests, and activities.

21. The method of claim 1, wherein the narrowed hit-list of resources is provided from the hit-list.

22. A machine-readable storage medium comprising instructions, tangibly recorded on the storage medium, for performing a method when executed by at least one processor, the method comprising:
   storing a data source of resource profiles associated with a plurality of resources, each resource being at least one of a plurality of resource types;
   receiving, through a user interface, one or more first attributes of a resource desired by a user, wherein receiving attributes comprises receiving a search template from the user and the search template is auto-configured based on the resource type, attributes, or facets;
   searching the data source of resource profiles for profiles having one or more of the first attributes;
   providing, to the user, a hit-list of resources having the one or more first attributes;

receiving one or more second attributes of the resource through a refinement user interface;

searching, using a processor, the hit-list for resources having the one or more second attributes;

providing, to the user, a narrowed hit-list of resources having the one or more first and second attributes;

storing the narrowed hit-list as a collection of resources which is used for further actions or stored as a persistent collection;

automatically creating two or more segments of the narrowed hit-list by grouping the resources according to one of a plurality of attribute dimensions;

generating, for the user, statistics associated with the segments;

receiving a selection of two or more segments through the user interface;

providing, to the user, a subset of the narrowed hit-list based on the selected two or more segments; and using the hit-list to create a community, the community only including users sharing the first attribute.

23. The machine-readable storage medium of claim 22, further comprising:

displaying, in response to a user query, resources of the hit-list for user inspection;

maintaining a list of resources displayed for inspection by the user;

displaying a search history of search queries previously entered by a user, including a list of resources previously displayed;

allowing the user to back-navigate to a search within the search history by displaying the corresponding hit-list; and displaying the list of inspected resources as the hit-list.

24. The machine-readable storage medium of claim 22, comprising defining the resource profiles by facets, attributes, and descriptions of the sources of the attributes.

25. The machine-readable storage medium of claim 24, comprising generating a pattern-based user interface of a search tool from the resource profile.

26. The machine-readable storage medium of claim 23, further comprising:

receiving at least one selected resource type;

providing a second narrowed hit-list of resources having the selected resource type from the narrowed hit-list; and storing the second narrowed hit-list as a second collection of resources for using for further actions or storing as a persistent collection.

27. The machine-readable storage medium of claim 22, further comprising aggregating the narrowed hit-list with an existing collection of resources.

28. The machine-readable storage medium of claim 27, wherein the existing collection of resources comprises an historical listing of aggregated narrowed hit-lists.

29. The machine-readable storage medium of claim 26, further comprising storing instructions operable to cause the one or more machines to perform operations comprising creating a layout of the segments of the narrowed hit-list by discrete values of an attribute dimension.

* * * * *